Patented Oct. 14, 1930

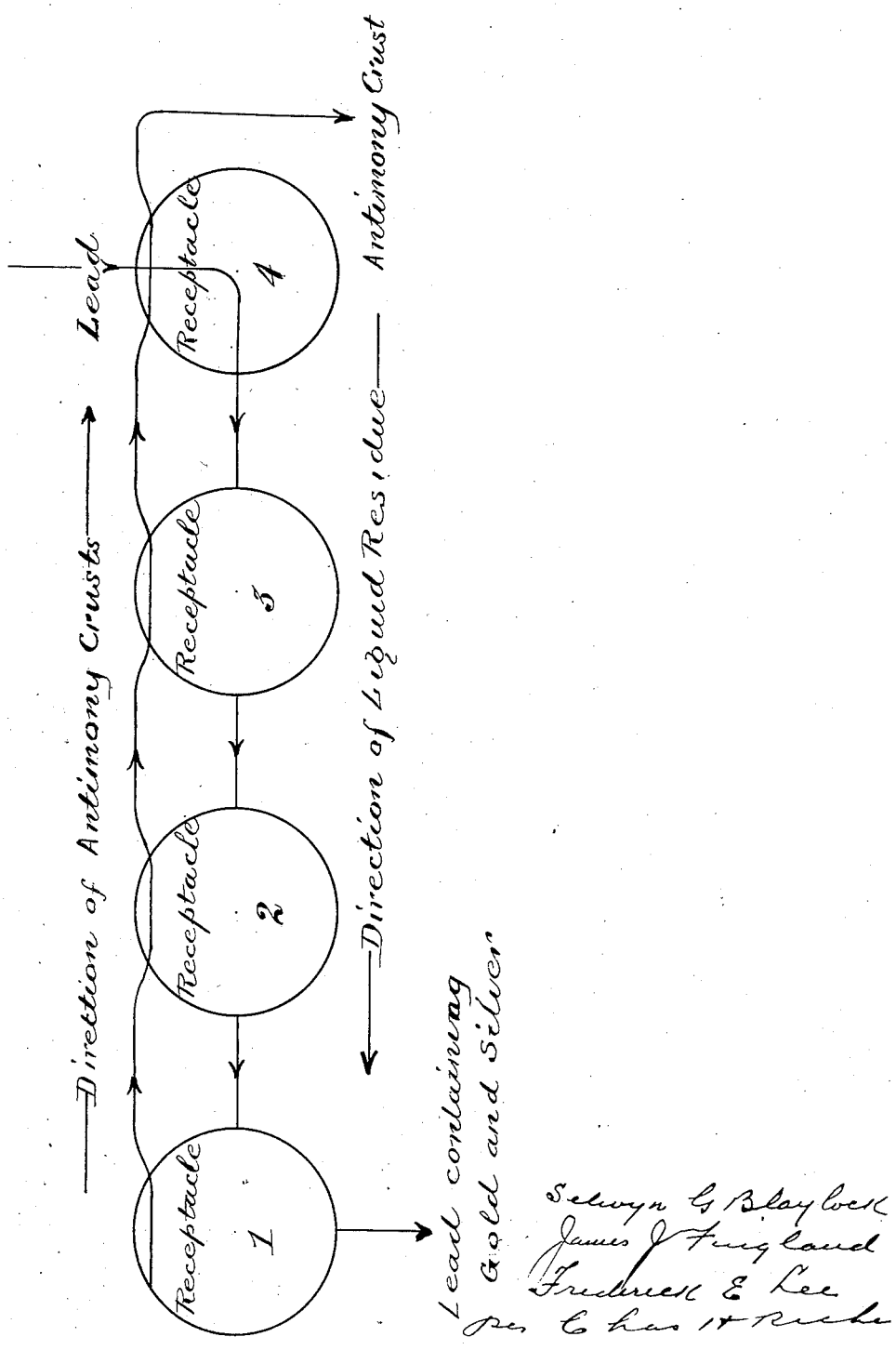

1,778,018

UNITED STATES PATENT OFFICE

SELWYN GWILLYM BLAYLOCK, JOHN JAMES FINGLAND, AND FREDERICK ERIC LEE, OF TRAIL, BRITISH COLUMBIA, CANADA, ASSIGNORS TO THE CONSOLIDATED MINING AND SMELTING COMPANY OF CANADA, LIMITED, OF MONTREAL, QUEBEC, CANADA, A CORPORATION OF CANADA

PROCESS FOR AND RELATING TO SEPARATING GOLD, SILVER, AND LEAD FROM CRUDE ANTIMONIAL METAL

Application filed May 3, 1929, Serial No. 360,302, and in Canada May 21, 1928.

Our invention relates to the separation of the contained gold, silver, and lead in crude antimonial metal, resulting from the reduction of antimony ores, antimony flue dusts and antimonial by-products, into a fractional proportion of the metal treated and the recovery, by fractional crystallization, of the major proportion of the antimony substantially free from gold, silver, and lead.

Crude antimonial metal, containing gold, silver, and lead, on cooling slowly from the liquid state tends to separate into two distinct parts, one a solid consisting of antimony much freer from gold, silver, and lead than the original metal, and the other a liquid, which carries the major part of the gold, silver, and lead contents of the metal treated. As this separation can be successfully carried out with crude antimonial metal containing as much as 10% arsenic, a preliminary treatment for the removal of the arsenic is not essential where the proportion of arsenic in the metal treated is not in excess of that amount.

In the treatment of crude antimonial metal containing gold and silver, without any appreciable proportions of lead there is a tendency for the gold and silver to be retained in the crusts to a greater degree than when a sufficient proportion of lead is present and in the absence of a sufficiency of lead it may be necessary to effect a number of successive fractional crystallizations to secure the maximum concentration of the gold and silver in the end product of the series. Where there is such a deficiency of lead in the crude antimonial metal the number of fractionations may be reduced to normal proportions by the addition of lead, so that in the crude antimonial metal to be treated lead is present in approximately the following proportions:— 100 parts of lead for every 2.25 parts of contained silver over and above any proportion of lead which may be required for contained gold, and 100 parts of lead for every 4 parts of gold over and above any proportion of lead which may be required for the contained silver.

An excess of lead over and above these proportions does not interfere with the successful conduct of the process provided the total lead in the metal treated does not exceed 30%. Where the amount of crude antimonial metal with a deficiency in the required proportions of lead is a relatively small percentage of the total amount of crude antimonial metal under treatment, the number of fractionations can be kept normal by the introduction of such deficient metal into the series of fractionations at a point where the associated metal contains a sufficiency of lead to provide the requisite ratios for the admixture.

The receptacle or furnace in which the fractional crystallizations are conducted is not a part of this invention, but a suitable receptacle or furnace for the purpose may be composed of or lined with silicious refractories, such as fireclay, externally heated, and provided with a tapping or other arrangement which will allow the withdrawal of the residual liquid after the treatment is completed. The heating apparatus should be such that the temperature within the receptacle may be raised to any desired degree between 450° C. and 700° C. and so regulated that crusts do not form on the lower sides and bottom of the receptacle during crystallization.

A number of these receptacles or furnaces may be arranged in series, and in carrying out the fractional crystallization each receptacle or furnace is so operated that the liquid residue, from each successive treatment, passes to the receptacle on the left for re-treatment and the crust, from each successive treatment, passes to the receptacle on the right for further treatment. An apparatus suitable for this purpose is shown conventionally in the accompanying drawing. The charge to be treated, which may be an admixture of crusts from the receptacle on the left and residual liquid from the receptacle on the right, or which may be new metal introduced into the system with or without the addition of lead as required, or which may be part new metal and part crust and part liquid residue admixed in such proportions as will facilitate and limit the total number of fractional crystallizations required to secure the desired concentration of the gold, silver, and lead in the final residues and the desired degree of purity in the final crusts, is melted and then cooled until a crust begins to form on the surface of the metal bath. On reaching this stage the subsequent cooling is so adjusted, with the aid of auxiliary heating appliances if necessary, that the solidification of the antimony to develop the crust is sufficiently retarded to prevent the entrainment of the liquid residue, which, as the proportion of crust increases, will contain, successively increasing proportions of gold, silver, and lead. Care should be taken to see that the crust once formed is in continued contact with the residual liquid metal, otherwise the latter may be over-cooled and when crystallization again proceeds it may be accomplished so rapidly that entrainment of the liquid residue in the so formed crust cannot be prevented. The crusts are developed until from one third to two thirds of the charge has solidified, the proportion being determined by the degree of entrainment which takes place at the specific rate of cooling applied during the fractional crystallization.

It may be advantageous or necessary to employ a series of fractional crystallizations, the operation and the co-ordination of each crystallization of the series, except in the case of the intermediates in process, accomplishing the separation of the crude antimonial metal treated into two parts, one consisting of antimony substantially free from gold, silver, and lead which may be refined by known metallurgical methods for the recovery of market antimony; the other, containing the major part of the gold, silver, and lead, together with a fractional part of the antimony which may be treated by known metallurgical methods for the recovery of the contained metals.

Having thus fully described our invention, what we claim as new and desire to secure by Letters Patent is:

1. A process for separating the contained gold, silver, and lead from crude antimonial metal by fractional crystallization of the molten mass, comprising cooling of the molten mass slowly to a temperature which allows of the separation of a solid crust substantially impoverished in gold, silver, and lead, removing the crust and leaving a liquid residue as a fractional part of the metal treated containing the major part of the gold, silver, and lead, and admixing the crust of this fractionation with the residual liquid of another fractionation.

2. A process for separating the contained gold, silver, and lead from crude antimonial metal by fractional crystallization of the molten mass, comprising cooling of the molten mass slowly to a temperature which allows of the separation of a solid crust substantially impoverished in gold, silver, and lead, removing the crust and leaving a liquid residue as a fractional part of the metal treated containing the major part of the gold, silver, and lead, admixing the crust of this fractionation with the residual liquid of another fractionation, effecting the fractionation of this admixture, and repeating the mixing and fractionation until the crust contains the major part of the antimony, and the liquid residue contains the major part of the gold, silver, and lead.

3. A process for segregating the contained gold, silver, and lead, from crude antimonial metal by a series of fractionations of the molten mass, comprising adding lead to the charge to bring it to the proportion required by the gold, and silver, so that the silver contents of the charge approximate 2.25% of the contained lead over and above the lead required for the gold, and the gold contents of the charge approximate 4% of the contained lead over and above the lead required for the silver, cooling the liquid mass slowly to a temperature which allows of the separation of a solid crust substantially impoverished in gold, silver, and lead, removing the crust and leaving a liquid residue as a fractional part of the metal treated containing the major part of the gold, silver, and lead, admixing the crust of this fractionation with the residual liquid of another fractionation, effecting the fractionation of this admixture, and repeating the mixing and fractionation until the crust fraction contains the major part of the antimony, and the liquid fraction contains the major part of the gold, silver, and lead.

Dated at the city of Trail, in the District of Kootenay, and Province of British Columbia, this seventh day of March, 1929.

SELWYN GWILLYM BLAYLOCK.
JOHN JAMES FINGLAND.
FREDERICK ERIC LEE.